United States Patent
Forg et al.

(10) Patent No.: US 10,948,355 B2
(45) Date of Patent: *Mar. 16, 2021

(54) HIGH RESOLUTION THERMOPILE INFRARED SENSOR ARRAY HAVING MONOLITHICALLY INTEGRATED SIGNAL PROCESSING

(71) Applicant: HEIMANN SENSOR GMBH, Dresden (DE)

(72) Inventors: Bodo Forg, Mainz (DE); Michael Schnorr, Niedernhausen (DE); Jörg Schieferdecker, Dresden (DE); Karlheinz Storck, Ingelheim (DE); Marion Simon, Bad Schwalbach (DE); Wilhelm Leneke, Taunusstein (DE)

(73) Assignee: HEIMANN SENSOR GMBH, Dresden (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/710,778

(22) Filed: Dec. 11, 2019

(65) Prior Publication Data
US 2020/0124481 A1    Apr. 23, 2020

Related U.S. Application Data

(63) Continuation of application No. 15/766,100, filed as application No. PCT/EP2016/065844 on Jul. 5, 2016, now Pat. No. 10,578,493.

(30) Foreign Application Priority Data
Oct. 5, 2015    (DE) .................. 10 2015 116 866

(51) Int. Cl.
*G01J 5/02*    (2006.01)
*G01J 5/08*    (2006.01)
(Continued)

(52) U.S. Cl.
CPC .......... *G01J 5/0881* (2013.01); *G01F 1/6888* (2013.01); *G01J 5/06* (2013.01);
(Continued)

(58) Field of Classification Search
CPC .... G01J 5/0081; G01J 5/06; G01J 5/12; G01J 5/22; G01J 5/14; G01J 5/0881; H04N 5/378; H04N 5/33; G01F 1/6888
See application file for complete search history.

(56) References Cited

U.S. PATENT DOCUMENTS 6,046,398 A    4/2000    Foote et al.
2003/0169196 A1    9/2003    Ono et al.
(Continued)

FOREIGN PATENT DOCUMENTS

DE    10322860    11/2005
EP    2587234    1/2013
(Continued)

OTHER PUBLICATIONS

International Search Report issued in PCT/EP2016/065844 dated Sep. 15, 2016.
(Continued)

*Primary Examiner* — Kiho Kim
(74) *Attorney, Agent, or Firm* — Heslin Rothenberg Farley and Mesiti PC; Nicholas Mesiti

(57) ABSTRACT

A high-resolution thermopile infrared sensor array having monolithically integrated signal processing and a plurality of parallel signal processing channels for the signals from pixels of a sensor array, and a digital port for the serial output of the pixel signals are provided, wherein the sensor array is located on one or more sensor chips. The thermal piled infrared sensor array possesses low power loss, high integration density and high thermal and geometric resolution. Each signal processing channel ($K_1 \ldots K_N$) has at least (Continued)

Figure 1:
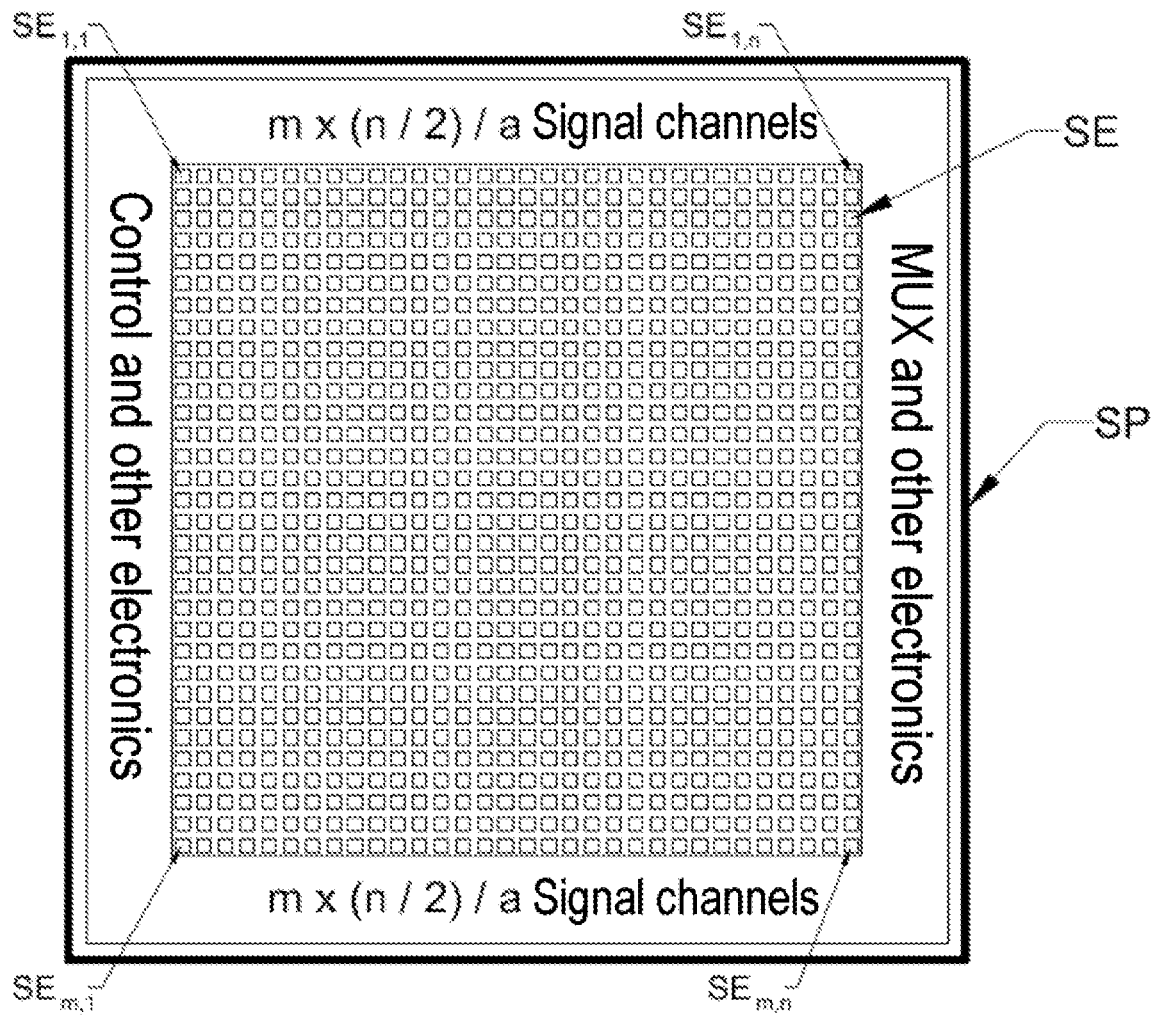

one analogue/digital converter (ADC), and is assigned a memory region in a memory (RAM) for storing the signals from the pixels (SE).

15 Claims, 5 Drawing Sheets

(51) Int. Cl.
*G01J 5/06* (2006.01)
*G01F 1/688* (2006.01)
*H04N 5/33* (2006.01)
*H04N 5/378* (2011.01)
*G01J 5/12* (2006.01)
*G01J 5/14* (2006.01)
*G01J 5/22* (2006.01)

(52) U.S. Cl.
CPC . *G01J 5/12* (2013.01); *G01J 5/14* (2013.01); *G01J 5/22* (2013.01); *H04N 5/33* (2013.01); *H04N 5/378* (2013.01)

(56) References Cited

U.S. PATENT DOCUMENTS

| | | | |
|---|---|---|---|
| 2007/0194962 A1* | 8/2007 | Asayama | H03M 1/66 341/144 |
| 2008/0216883 A1 | 9/2008 | Leneke et al. | |
| 2010/0026536 A1 | 2/2010 | Yoshioka | |
| 2012/0245439 A1 | 9/2012 | Andre et al. | |
| 2013/0126735 A1 | 5/2013 | Plotz et al. | |
| 2013/0214952 A1 | 8/2013 | Makinwa et al. | |
| 2013/0284927 A1 | 10/2013 | Kryskowski | |

FOREIGN PATENT DOCUMENTS

| | | |
|---|---|---|
| JP | 2001255203 | 9/2001 |
| JP | 2002365130 | 12/2002 |
| JP | 2003532111 | 10/2003 |
| JP | H0743216 | 10/2003 |
| JP | 20014170375 | 6/2004 |
| JP | 2006098223 A | 4/2006 |
| JP | 2008187299 | 8/2008 |
| JP | 2008-541102 | 11/2008 |
| JP | 2012112665 | 6/2012 |
| JP | 2013535162 | 9/2013 |
| KR | 10-2013-0065006 | 6/2013 |
| KR | 10-2013-0070583 | 6/2013 |
| WO | 2006122529 | 11/2006 |
| WO | 2013120652 | 8/2013 |
| WO | 2014/198625 | 12/2014 |
| WO | 2015/051274 | 4/2015 |

OTHER PUBLICATIONS

V. Kassovski et al., "Miniaturized 4×16 Thermopile Array Sensor with integrated on Signal Conditioning on Chip," AMA Conferences, Jun. 7, 2011, p. 57.

Hirota et al., Proceedings of SPIE, International Symposium on Optical Science and Technology, 2002, Seattle, WA, United States, Jan. 23, 2003, pp. 238-249.

* cited by examiner

HIGH RESOLUTION THERMOPILE INFRARED SENSOR ARRAY HAVING MONOLITHICALLY INTEGRATED SIGNAL PROCESSING

CROSS REFERENCE TO RELATED APPLICATIONS

This application is a continuation of, and claims priority to, U.S. patent application Ser. No. 15/766,100, filed on Apr. 5, 2018, which is the National Phase filing under 35 U.S.C. § 371 of International Application No.: PCT/EP2016/065844, filed on Jul. 5, 2016, and published on Apr. 13, 2017 as WO 2017/059970 A1, and claims priority to German Application No.: 10 2015 116 866.9, filed on Oct. 5, 2015. The contents of each of the prior applications are hereby incorporated by reference herein in their entirety.

BACKGROUND ART

The invention relates to a high-resolution thermopile infrared sensor array having monolithically integrated signal processing and a plurality of parallel signal processing channels for the signals from pixels of a sensor array, and also a digital port for the serial output of the signals of the pixels, wherein the sensor array is situated on one or more sensor chips.

In order to construct a high-resolution thermopile infrared sensor array, the number of individual thermopile elements, i.e. the number of pixels, must increase and the geometric dimensions of the pixels themselves must decrease. The thermopile sensor arrays originally available commercially comprised only a small number of pixels (e.g. 8×8 pixels or 16×16 pixels), wherein the individual pixels were very large (e.g. 150 . . . 300 μm×150 . . . 300 μm). There was thus enough space on the sensor chip (e.g. composed of silicon) to accommodate a few amplifiers or low-pass filters on the chip alongside the thermopile sensor array.

Currently customary thermopile sensor arrays having larger numbers of pixels require a reduction of the dimensions of the pixels to a side length of 100 μm, or even down to 25 μm. However, the smaller pixels resulting from the increasing integration density have the disadvantage that they generate an area-proportionally smaller signal. That means that, given half a pixel size, only one quarter of the signal strength is available for the further processing.

The signal voltages, which are thus ever lower and are usually in the nV range up to a few μV, require ever higher gain factors in order that signals can be processed further without additional noise or other interference influences outside the actual sensor housing. The consequence, however, is an ever lower signal-to-noise ratio.

The signal gain required as a result of the low signal voltages is at least a few 1000, usually even above 10,000, in order to raise the signal voltage to an extent such that it can be passed on to other assemblies and processed further. The high-gain analog amplifiers traditionally used for signal amplification require multi-stage amplifiers with a relatively large area requirement and, moreover, these amplifiers have a considerable current consumption. That means that the power loss and thus at the same time the inherent heating increase, which in turn leads to an increase in the measurement error of the thermopile sensor array overall.

In the meantime, infrared thermopile sensor arrays produced on one chip by means of silicon micromachining have become known in a variety of embodiments. In these sensor arrays, a portion of the signal processing takes place on the chip, but only a small number of preamplifiers and a common multiplexer are present, the latter outputting the signals of all the pixels. The thermopiles have so-called "hot" contacts on an infrared reception area becoming smaller and smaller, and so-called "cold" contacts on a heat sink at the edge of the respective pixel. The signal voltage generated by the thermopile is directly dependent on the achievable temperature difference between the "hot" and "cold" contacts.

By way of example, in the case of a thermopile sensor array in accordance with WO 2006/122529 A1, for each row of the sensor array respectively one preamplifier and one low-pass filter are integrated on the chip. That is insufficient, however, for high-resolution sensor arrays having many rows and columns. By way of example, only 64 preamplifiers and 64 low-pass filters are used in the case of an array of 64×64 pixels. The achievable noise bandwidth would be up to 64 times higher than necessary. Since the noise increases with the root of the noise bandwidth, however, the noise could be reduced by up to 8-fold, or the thermal resolution capability could be improved by up to 8-fold.

However, no measures are specified for a current- and space-saving solution for the signal amplification per signal channel.

Furthermore, JP 2004-170375 A discloses a thermopile sensor array which comprises only a single preamplifier.

DE 103 22 860 B4 describes a circuit arrangement for reading out electronic signals from high-resolution thermal sensors with preamplifiers which are situated upstream of a multiplexer. In order to reduce the considerable power loss of the individual preamplifiers operating in parallel, the latter are cyclically switched off in order to save power.

It is precisely as a result of this measure that the high temperature resolution desired is not achieved, however, because the preamplifiers upstream of the multiplexer can obtain the expected result only if the noise bandwidth of the sampled signal is simultaneously reduced proportionally to the number of parallel amplifier channels. That is not possible, however, if the amplified signal, via the preamplifiers, is not continuously "integrated" by means of a low-pass filter for noise bandwidth limiting, or smoothed e.g. via a low-pass filter.

EP 2 587 234 A1 discloses a thermopile infrared sensor having a circuit for signal processing in which the signals of the individual pixels are forwarded without band limiting, or interposed preamplifiers.

All the solutions above describe thermopile infrared sensor arrays, but without proposing measures for signal processing in conjunction with a higher integration density on the chip. In particular, there are no proposals for reducing the noise bandwidth in conjunction with an extremely small space requirement and an extremely low power loss.

The know solutions have an inadequate thermal resolution capability because only a single or only very few preamplifier channels has/have been integrated on the sensor chip, which leads to a high noise bandwidth and at the same time to a poor signal/noise ratio.

A high integration density requires a reduction of the pixel size and the so-called pixel pitch, i.e. the center-to-center distance between the thermopile pixels, in order thereby to accommodate more pixels on the same chip area. In addition, a high thermal resolution, i.e. a high signal/noise ratio, and a low noise-limited temperature resolution NETD (Noise Equivalent Temperature Difference), are also desirable besides a high geometric resolution.

Owing to the smaller reception area and owing to the resultant small distance between the "hot" and "cold" contacts of the thermopile pixels, a reduction of the pixel size simultaneously also leads to a reduction of the sensor signal emitted by the thermopile pixel, which leads to a lower signal/noise ratio, poorer thermal resolution capability and to a reduced measurement accuracy.

In principle, it is possible to reduce the size of thermopile cells (thermopile pixels) and to integrate ever greater numbers of pixels on the sensor chip. By way of example, 16×16, 32×32, 64×64, 128×128 thermopile pixels or more are realized on one sensor chip. The signal voltages of the individual thermopile pixels would have to be multiplexed by means of m×n addressing and MUX switches, i.e. passed onto a common, serial signal line to one amplifier per array, or via a common serial interface per row or column.

Since the signals still able to be minimally resolved from thermopile pixels having further reduced pixel dimensioning are still in the nV range for many applications, the signals still have to be sufficiently highly amplified and processed further on the chip, such that they cannot be influenced by electrical interference influences outside and within the sensor chip.

Gain factors of typically 10,000 or more are necessary in the case of the known solutions in order to amplify the sensor signals of such small thermopile pixels to a few mV, in order that the sensor signals downstream of the MUX (multiplexer) can be output from the sensor chip on a fast serial analog output—or can be converted into digital signals by a fast AD converter integrated on or directly alongside the sensor chip.

The disadvantage here is that the bandwidth of these preamplifiers downstream of the multiplexer has to be very high in order to transmit the sensor signals of many successively sampled thermopile pixels still with image frequencies of from a plurality of Hz to tens of Hz.

This necessitates at least m×n times the frame rate in the case of one preamplifier per array, or m times the frame rate for an array having m columns and respectively one preamplifier per column. With the root of the (noise) bandwidth, however, at the same time the noise of the system also increases and the temperature resolution NETD deteriorates.

High-gain amplifiers which operate stably and accurately require a plurality of amplifier stages, need a relatively large amount of space on the sensor chip and additionally have a considerable current consumption with correspondingly high waste heat, which in turn further reduces the achievable signal voltage of the thermopile elements.

For this reason, it is not possible to accommodate many of such large amplifiers alongside the pixels on the restricted space of a sensor chip.

BRIEF SUMMARY OF THE INVENTION

Therefore, the invention is based on the object of specifying a thermopile infrared sensor array having monolithically integrated signal processing and a plurality of parallel signal processing channels which has a high integration density in conjunction with an extremely low power loss and which at the same time has high thermal and geometric resolution.

In the case of a high-resolution thermopile infrared sensor array of the type mentioned in the introduction, that is achieved by virtue of the fact that each signal processing channel (K1 . . . KN) is arranged on the sensor chip (SP) or in proximity thereto and comprises at least one analog/digital converter (ADC) and in that each signal processing channel (K1 . . . KN) is assigned a memory area in a memory (RAM) for storing the results of the analog/digital converters (ADC).

The center-to-center distance between individual pixels of the sensor array is less than 300 μm and preferably less than 100 μm.

In one advantageous configuration of the invention, each signal processing channel is assigned at least one pixel and at most a number of 16 or 8 pixels, preferably only 4, 3 or 2 pixels and particularly preferably one pixel.

Furthermore, for each signal processing channel provision can be made of a signal multiplexer for selecting the pixels of the sensor array that are assigned to the signal processing channel.

In a further configuration of the invention, a preamplifier is connected upstream of the analog/digital converter in each signal processing channel.

The preamplifiers have a gain factor that is less than 500 and particularly preferably less than 100.

The analog/digital converter has a resolution of between at least 10 bits and preferably at least 16 bits, wherein the analog/digital converter operates according to an integrating method, for example a "charge balancing" or a "delta-sigma" method.

In a further continuation of the invention, each signal processing channel contains a low-pass filter for limiting the noise bandwidth, the cut-off frequency of said low-pass filter being at least the product of the frame rate of the thermopile infrared sensor array and the number of pixels per signal processing channel, but preferably not higher than double or triple the absolute value of the product.

Finally, the low-pass filter can be part of an integrating analog/digital converter.

The noise bandwidth of each signal processing channel is determined depending on the respective frame rate by means of the use of an integrating analog/digital converter and the predefined conversion rate of the analog/digital converter operating for example according to the "charge balancing" method.

A portion of the signal processing channels is preferably arranged in each case in the interspace between the pixels, i.e. in proximity to the heat sink.

Furthermore, in the interest of uniform distribution of the power loss that arises, it is advantageous if at least one portion of the signal processing channels is arranged together with further electronics in the region surrounding the sensor array in the outer edge region of the sensor chip.

Finally, further electronic components such as for the reference voltage, the voltage supply, a reset circuit, a temperature reference, a reference data memory, a clock generator, an I/O digital port and also digital signal processing (e.g. a digital controller) can be integrated on the sensor chip alongside the signal processing channels and the signal multiplexers.

An EEPROM or a flash memory is particularly suitable as reference data memory.

In one very special configuration of the invention, at least one portion of the signal processing channels is arranged below the sensor chip with the sensor elements on a separate chip, wherein the electrical connection of the pixels to the signal processing channels or/and further electronic components is effected by means of vias through the sensor chip or other electrical connection means such as redistribution wirings, wherein the thermopile infrared sensor chip (SP) and the separate chip (ROIC) are fixedly connected to one another. The area requirement of the sensor chip can be considerably reduced again in this way.

BRIEF DESCRIPTION OF THE DRAWING FIGURES

Figure 2:
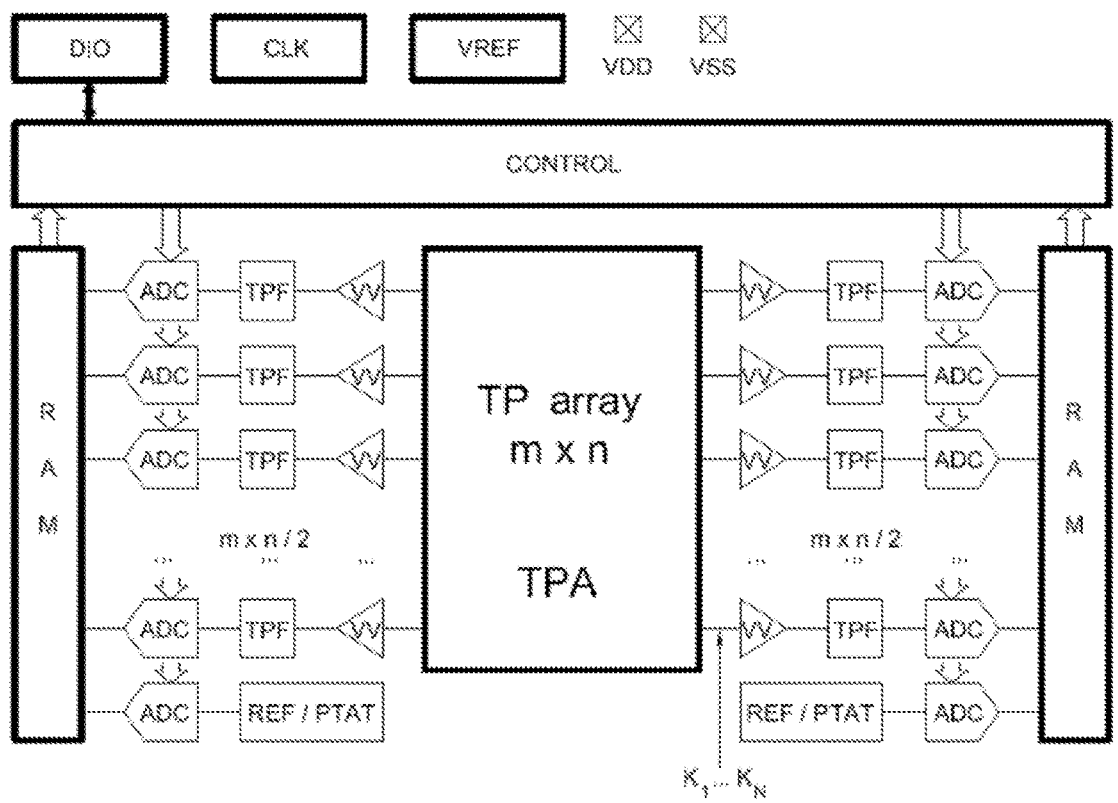
Figure 3:
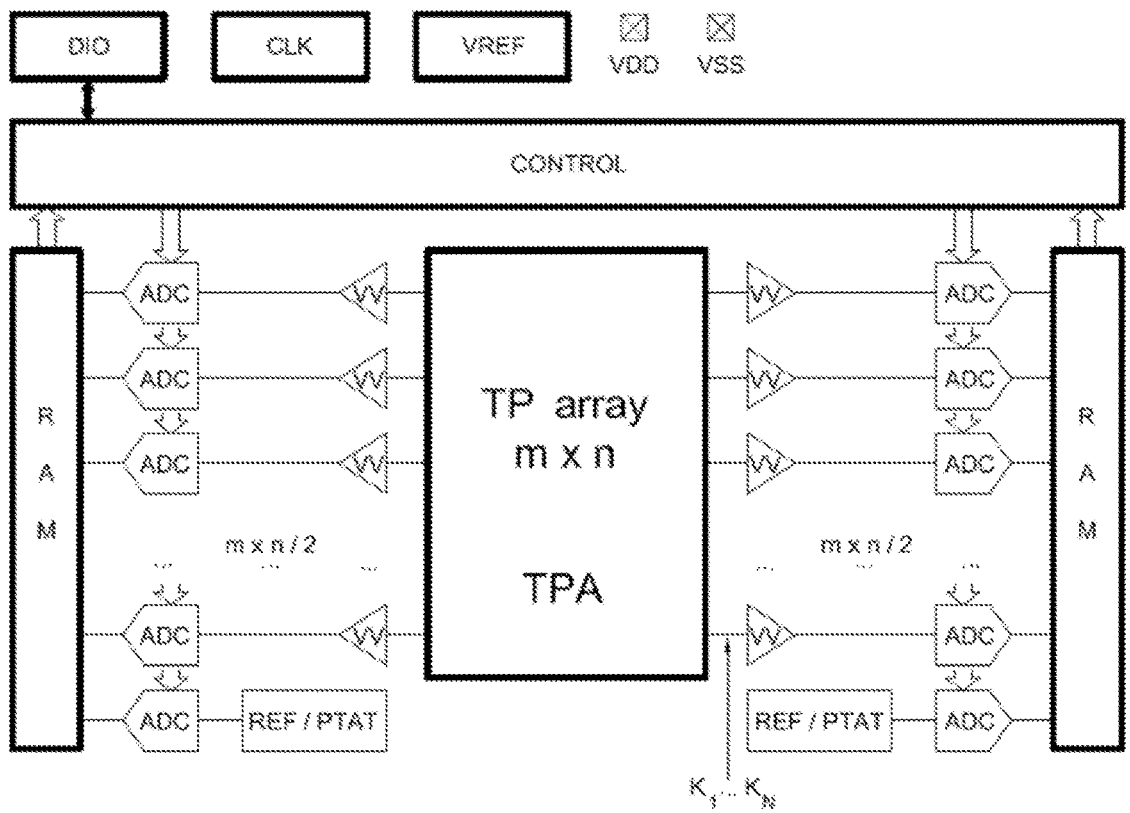
Figure 4A:
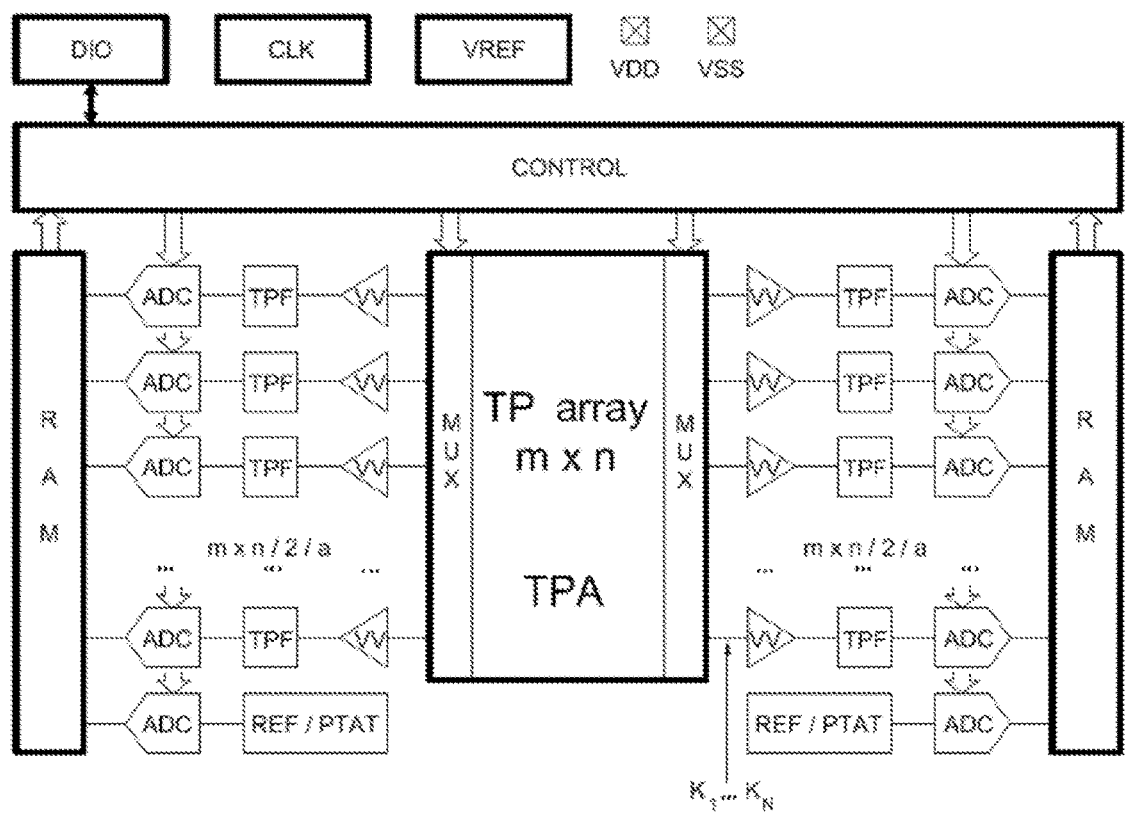
Figure 4B:
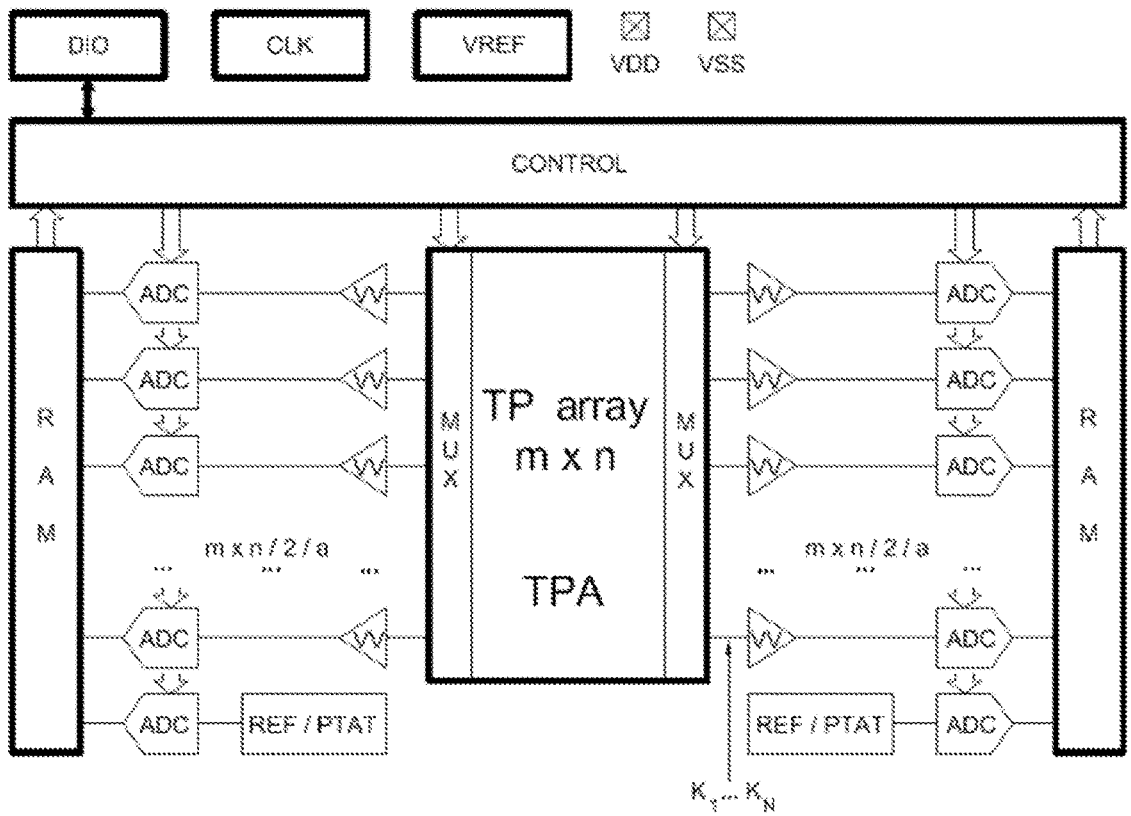
Figure 5:
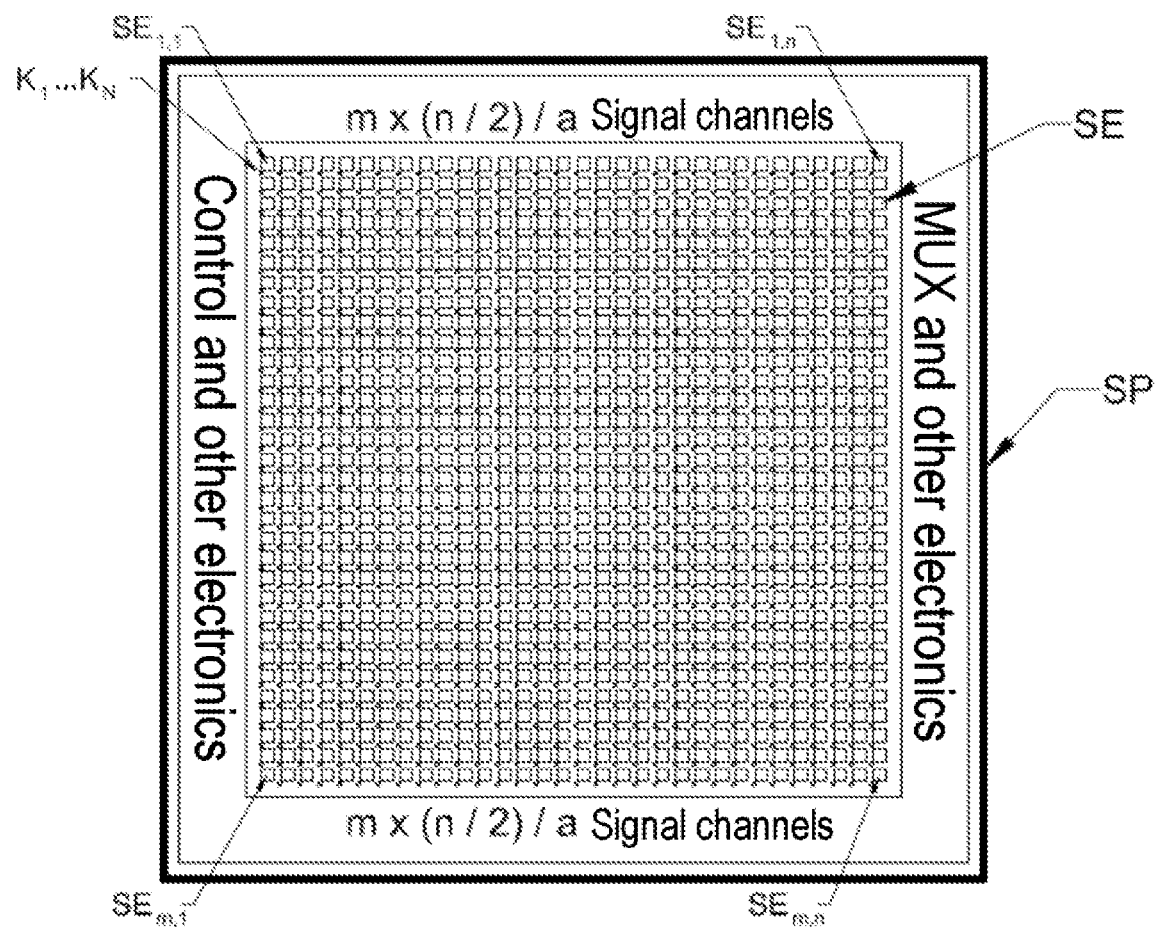
Figure 6A:
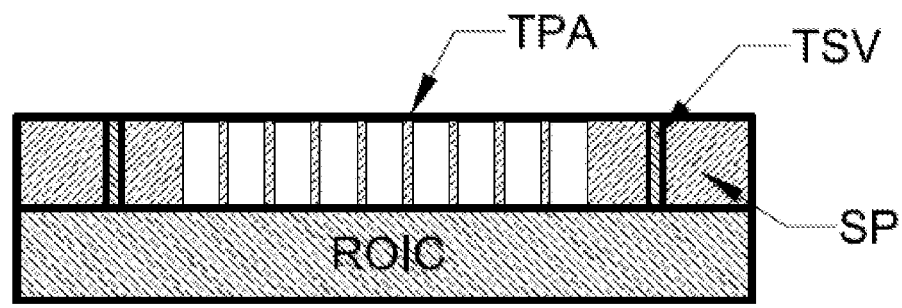

The invention is explained in greater detail below on the basis of exemplary embodiments. In the associated figures of the drawings:

FIG. 1: shows the basic construction of a thermopile infrared sensor array according to the invention;

FIG. 2: shows a block diagram of a circuit arrangement according to the invention for integrated signal processing for thermopile infrared array sensor chips with low-pass filter and respectively one signal processing channel per pixel;

FIG. 3: shows a block diagram of a circuit arrangement according to the invention for the integrated signal processing for thermopile infrared array sensor chips in a second embodiment, in which the low-pass filter function is implemented in an integrated ADC (AD converter);

FIG. 4a: shows a block diagram of a circuit arrangement according to the invention for integrated signal processing for thermopile infrared array chips in a third embodiment, in which a plurality of pixels share a signal processing channel with a low-pass filter downstream of the preamplifier;

FIG. 4b: shows a block diagram of a circuit arrangement according to the invention for integrated signal processing for thermopile infrared array chips in a third embodiment, in which a plurality of pixels share a signal processing channel with an integrating AD converter that performs a low-pass filter function;

FIG. 5: shows a block diagram of a further circuit arrangement according to the invention for the integrated signal processing for thermopile infrared sensor arrays, in which the low-pass filter function is implemented in an integrating AD converter;

FIG. 6a: shows a schematic sectional illustration of a sensor chip having vias and, arranged below it, a separate chip having signal processing channels and further memory and signal processing electronics integrated therein; and FIG. 6b: shows the arrangement according to FIG. 6a, but supplemented by a cap wafer having a radiation entrance window and additional electrical connection means such as bond wires for connection to further functional assemblies for the operation of the thermopile infrared sensor array.

DETAILED DESCRIPTION

FIGS. 1 and 2 reveal the basic construction of a thermopile infrared sensor array according to the invention comprising, arranged in the center of the sensor chip, a thermopile infrared sensor array TPA in matrix form having m×n pixels SE 1.1 . . . SE 1.n×SE m1.1 . . . SE m, nAround the pixels SE or around the pixel array, preferably on two sides, m×(n/2)/a signal processing channels K1 . . . KN are situated on the same sensor chip SP, which signal processing channels amplify and filter the signals of the individual pixels SE and convert them into digital signals. Here a signal processing channel K1 . . . KN is shared by a respective number of a pixels.

In principle, all the signal processing channels may also lie on one side of the pixel array, wherein the thermopile infrared sensor array then has an asymmetrical heat distribution.

What is essential for the function of thermopiles is that they have "hot" and "cold" contacts which are connected to one another via the longest possible conductive tracks, i.e. are arranged as far away from one another as possible, and wherein the "hot" contacts are arranged on a radiation receiver (not illustrated) and the "cold" contacts are arranged on a heat sink at the edge of the pixel in order to generate an evaluatable signal voltage depending on the temperature difference between the "hot" and "cold" contacts.

Each pixel SE of the thermopile infrared sensor array TPA contains a miniaturized thermopile cell, known per se, and above each thermopile cell optionally a radiation entrance window with a suitable optical unit. The individual thermopile cells have a center-to-center distance (so-called pixel pitch) of at most 400 μm, preferably less than 200 μm and particularly preferably of less than 100 μm. The smaller the pixel pitch, the smaller the entire thermopile infrared sensor array chip becomes and the dimensions of the required optical unit for imaging the infrared radiation on the pixel SE also decrease for the same number of pixels. A reduction of the chip and optical unit dimensions usually also leads to lower manufacturing costs.

Optionally, a smaller pitch allows more pixels SE to be accommodated on a sensor chip of predefined size, in order thus to achieve a higher optional resolution capability.

FIG. 2 shows a block diagram of a circuit arrangement according to the invention for the integrated signal processing for thermopile infrared sensor arrays TPA having a mirror-inverted construction, having a central thermopile infrared sensor array TPA having a preamplifier VV, a low-pass filter TPF connected downstream and an analog/digital converter ADC for each signal processing channel K1 . . . KN on two sides of the sensor array TPA per pixel SE.

The outputs of the analog/digital converters ADC are connected to a memory array RAM, which can be read via a control circuit CRTL, such that the digital output signals are available for further processing at a digital input and output port DIO.

Furthermore, there are situated on each chip SP the assemblies necessary for operation such as clock generator CLK and for the necessary voltage supply VDD, VSS and one of more reference voltages VREF or REF/PTAT and also additional ESD circuit blocks are available.

According to the invention, a large number of individual signal processing channels K1 . . . KN are integrated on or below the same sensor chip SP, wherein a number a of at most 16 or 8 pixels SE share a signal processing channel K1 . . . KN, but preferably only in each case a=4, 3 or 2 pixels SE share a signal processing channel.

The corresponding number a of pixels SE is connected to the respectively assigned signal processing channel K1 . . . KN via multiplexers MUX, or regions of a multiplexer MUX (FIG. 4a). Particularly preferably, each pixel has a dedicated signal processing channel K1 . . . KN (i.e. a=1; see FIG. 3 and FIG. 4b). The smallest noise bandwidth and thus the lowest noise and the best temperature resolution are then achieved. Moreover, it is then possible to dispense with the multiplexers upstream of the signal processing channel K1 . . . KN (FIG. 2).

However, since space requirement and power loss also increase as a result of more signal processing channels K1 . . . KN, it may also be expedient, primarily in the case of sensor arrays TPA having very many pixels taking account of thermal resolution and space requirement, to choose a>1.

In order to accommodate as many signal processing channels K1 . . . KN as possible on the chip, both the area requirement and the power loss of the individual channels must be very small in order to keep down chip size and costs, but also thermal crosstalk between the thermopile pixels SE of the sensor array TPA.

In order to achieve that, signal processing channels K1 ... KN with in each case only one small low-noise preamplifier VV having a comparatively low gain factor, i.e. less than 500-fold, and a slow power-saving analog/digital converter ADC having a high resolution, i.e. having at least 10 bits, are used.

Preferably, preamplifiers VV having a gain factor of less than 100-fold are involved and the resolution of the analog/digital converter ADC should preferably be 16 to 24 bits.

The combination of a preamplifier VV having a low gain factor and a slow analog/digital converter ADC having a high resolution ensure a small area requirement owing to the low gain factor. Moreover, a low current consumption is ensured owing to the analog/digital converter ADC which, although it has a high resolution, operates comparatively with a low transmission rate.

Furthermore, the use of a high-resolution analog/digital converter ADC without the use of a preamplifier VV is conceivable. A small difference in the positive and negative reference voltage VREF of the analog/digital converters ADC is advantageous because the temperature resolution is increased as a result.

By way of example, so-called auto-zero (switched chopper) amplifiers, which are distinguished by low offset voltages and offset voltage drifts, are suitable as preamplifiers VV. Given a gain factor of <100 ... 500, a chopper amplifier can be constructed with a single stage and thus in a manner that saves a particularly large amount of space and power.

By way of example, the "sigma/delta" method or the "charge-balancing" method is suitable for slow analog/digital converters ADC having a high resolution. Since very many analog/digital converters ADC operate in parallel on the sensor chip SP, in comparison with conventional thermopile infrared sensor arrays having only one analog/digital converter ADC at the output a low conversion rate arises, which leads to the required low power loss and the small space requirement, as can be explained on the basis of a 64×64 sensor array TPA.

Analog/digital converters operating according to the "sigma/delta" method or the "charge-balancing" method are converters that are routine and known among those skilled in the art.

A sensor array constructed according to the prior art and having 64×64 pixels within only one analog/digital converter at a frame rate of 15 Hz requires a conversion rate of the analog/digital converter ADC of 64×64 pixels×15 Hz=61.440 Hz.

In the case of the analog/digital converters ADC operating in parallel according to the invention, a conversion rate of just 15 Hz (given a=1) or 60 Hz (given a=4) is required. That makes it possible to realize analog/digital converters ADC having a high resolution (e.g. 16 bits or more) with a very small current and space consumption.

The digitized signals of each signal processing channel K1 ... KN can be buffer-stored in a memory array of a memory RAM before they are relayed to the serial output data stream of an I/O digital port DIO. As a result, the time regime for reading out the data via the digital port DIO can be chosen such that the entire time of a frame is available for the integration and low-pass filtering of the pixel signals.

The noise bandwidth of the signal processing channels K1 ... KN should preferably be reduced to the minimum necessary, which results from the product of the number of pixels SE per signal processing channel K1 ... KN and the frame rate of the sensor array TPA.

That can be realized in a simple manner by a low-pass filter TPF being integrated upstream of the analog/digital converter ADC, which is possible for example as part of the preamplifier VV or as an additional low-pass filter TPF.

FIG. 3 and FIG. 4b illustrate a particularly space-saving variant in which the reduction of the noise bandwidth is achieved in a particularly preferred manner by means of the integrator behavior of a suitable analog/digital converter ADC, e.g. of an analog/digital converter ADC operating according to the charge balancing method.

A significant improvement in performance overall is achieved with the novel signal processing described above.

In the case of white noise, as is known, the noise increases with the root of the signal or noise bandwidth of the preamplifier VV. With the use of a 64×64 sensor array according to the prior art, the noise bandwidth would increase by 64×64 times the frame rate in the case of only one preamplifier VV and still by 64-fold in the case of one signal amplifier per column.

Consequently, the total noise and the temperature resolution of a 64×64 sensor array with one preamplifier VV would be higher by 64-fold, and in the case of 64 column amplifiers would still be higher by approximately 8-fold, compared with an array in which each pixel has a dedicated signal channel.

Therefore, by way of example, a 64×64 sensor array TPA according to the invention can achieve a thermal resolution capability up to 8 times higher than that of known sensor arrays constructed according to the prior art. Following the same mode of consideration, this results in a possible improvement in the thermal resolution capability by 4-fold in the case of a 16×16 sensor array TPA according to the invention, by 5.5-fold in the case of a 32×32 sensor array TPA and by 11-fold in the case of a 128×128 sensor array TPA.

If, in the case of a 128×128 sensor array TPA, the number of signal processing channels were reduced and e.g. a=16 pixels shared a signal processing channel, instead of an 11-fold improvement in the thermal resolution capability this would still achieve a 3-fold improvement in the signal/noise ratio by comparison with WO 2006/122529 A1 and by comparison with the rest of the prior art having only one signal transmission channel by 32-fold.

The signal processing channels K1 ... KN configured according to the invention can be arranged in the edge region of the individual pixels SE, as illustrated in FIG. 5, in the peripheral edge region of the sensor chip SP, i.e. outside the pixels, or in a manner distributed between both regions.

In order to achieve a good thermal balance and thus a homogeneous thermal image over the entire sensor chip SE, the power losses of the various assemblies should be distributed as homogeneously and symmetrically as possible on the sensor chip SE.

Alongside the actual signal processing channels K1 ... KN and the multiplexers MUX, further electronic components can be concomitantly integrated on the sensor chip and be connected to the digital interface via the multiplexers MUX (cf. FIG. 1 and FIG. 5). Said further electronic components may be temperature references, voltage references, memory means (e.g. EEPROMs for storing calibration data), possibly also small µControllers, e.g. for further signal conditioning or temperature calculation.

Furthermore, it may be advantageous to have additional information REF/PTAT, such as, for example, the signals from image pixels or pitch elements, inserted via the same signal processing channel with the serial data string, in order to compensate for drift effects and thereby to increase the measurement accuracy.

The setting of the most favorable noise bandwidth for the respective frame rate can be predefined during the use of an integrating analog/digital converter ADC by means of the internally generated master clock and the conversion rate predefined by the clock regime.

For the sake of completeness, it should be mentioned that the signal processing channels K1 . . . KN can also be arranged on a separate chip ROIC, below the actual sensor chip SP (FIGS. 6a, 6b).

FIG. 6a shows a schematic sectional illustration of a sensor chip SP having vias TSV and, arranged below it, a separate chip ROIC having, integrated therein, signal processing channels K1 . . . KN and the further memory and signal processing electronics as described above. The vias TSV are through openings through the sensor chip SP which are filled with a conductive material, which are insulated from the sensor chip SP and which are connected at the ends in each case to conductive tracks (not illustrated) on the sensor chip SP and respectively the separate chip RIOC. It goes without saying that there must also be a mechanically fixed connection between the sensor chip SP and the separate chip ROIC.

Figure 6B:
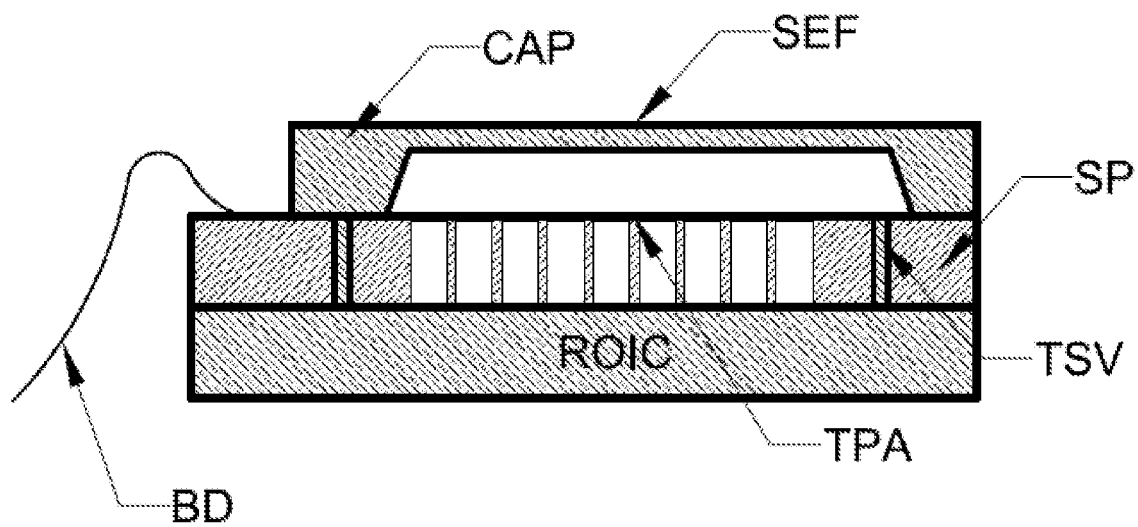

FIG. 6b reveals the same arrangement as in FIG. 6a, but supplemented by a cap wafer CAP on the sensor chip SP with a radiation entrance window SEF. The cap wafer CAP may consist in its entirety of an infrared-transmissive material, or merely comprise a region of this type above the sensor array TPA. Furthermore, provision can be made of additional electrical connection means such as bond wires BD for connecting the sensor chip SP to further functional assemblies on a printed circuit board, or the like, which are required for the operation of the thermopile infrared sensor array TPA.

Instead of the vias TSV for electrical connection between the sensor chip SP and the separate chip ROIC, redistribution wirings are also suitable, wherein conductive tracks are led around the side edge from the sensor chip SP to the separate chip ROIC.

LIST OF REFERENCE SIGNS

TPA Sensor array
VV Preamplifier
TPF Low-pass filter
ADC Analog/digital converter
$K_1$ . . . $K_N$ Signal processing channel
SE Pixel
SP Sensor chip
RAM Memory array
CRTL Control circuit
DIO Digital port
CLK Clock generator
VREF Reference voltage
VDD Drain voltage
VSS Source voltage
MUX Multiplexer
REF/PTAT Temperature reference
a Number of pixels
TSV Via
ROIC Separate chip
CAP Cap wafer
SEF Radiation entrance window
BD Bond wire

The invention claimed is:

1. A high-resolution two dimensional thermopile infrared sensor array having monolithically integrated signal processing, comprising:
   a plurality of parallel signal processing channels for signals from a plurality of pixels of a sensor array arranged on one or more sensor chips, and also a digital port for serial output of the signals of the pixels,
   wherein each signal processing channel is assigned to a number of pixels,
   wherein each signal processing channel is provided with a separate slow power-saving and high resolution analog/digital converter, each analog/digital converter having a resolution of 10 bits or more,
   wherein each signal processing channel is provided with no more than one preamplifier connected upstream of each of the separate analog/digital converters, each preamplifier having a gain factor that is less than 500-fold,
   wherein any center-to-center distance between adjacent pixels of the sensor array is less than 200 μm, and
   wherein the combination of the no more than one preamplifier having a low gain of less than 500-fold and the slow power saving and high resolution analog/digital converter enables both a significantly small power loss from the signal processing channels and a center to center distance between adjacent pixels of less than 200 μm.

2. The sensor array of claim 1, wherein each analog/digital converter has a conversion rate of 240 Hz or less.

3. The sensor array of claim 2, wherein the plurality of signal processing channels comprise at least 64 signal processing channels.

4. The sensor array of claim 3, wherein the plurality of pixels comprise at least 500 pixels.

5. The sensor array of claim 4, wherein each signal processing channel is assigned a maximum of 16 pixels.

6. The sensor array of claim 5, wherein the sensor array is situated on one or more sensor chips.

7. The sensor array of claim 1, wherein the plurality of parallel signal processing channels comprise at least 64 parallel signal processing channels.

8. The sensor array of claim 1, wherein the plurality of pixels comprise at least 500 pixels.

9. The sensor array of claim 1, wherein each signal processing channel is assigned a maximum of 16 pixels.

10. The sensor array of claim 1, wherein the sensor array is situated on one or more sensor chips.

11. A high-resolution two dimensional thermopile infrared sensor array having monolithically integrated signal processing, comprising:
    a plurality of parallel signal processing channels for signals from a plurality of pixels of a sensor array arranged on one or more sensor chips, and also a digital port for serial output of the signals of the pixels,
    wherein each signal processing channel is assigned to a number of pixels,
    wherein each signal processing channel is provided with a separate slow power-saving and high resolution analog/digital converter, each analog/digital converter having a resolution of 10 bits or more,
    wherein each signal processing channel is provided with no more than one preamplifier connected upstream of each of the separate analog/digital converters, each preamplifier having a gain factor that is less than 500-fold, wherein each signal processing channel is assigned a memory area in a memory for storing results of the analog/digital converters;

wherein any center-to-center distance between adjacent pixels of the sensor array is less than 200 µm, and wherein the combination of the no more than one preamplifier having a low gain of less than 500-fold and the slow power saving and high resolution analog/digital converter enables both a significantly small power loss from the signal processing channels and a center to center distance between adjacent pixels of less than 200 µm.

12. The sensor array of claim 11, wherein each analog/digital converter has a conversion rate of 240 Hz or less.

13. The sensor array of claim 12, wherein each signal processing channel is assigned a maximum of 16 pixels.

14. The sensor array of claim 13, wherein the plurality of parallel signal processing channels comprise at least 64 parallel signal processing channels.

15. The sensor array of claim 14, wherein the plurality of pixels comprise at least 500 pixels.

* * * * *